(12) United States Patent
Katsura et al.

(10) Patent No.: US 7,170,911 B2
(45) Date of Patent: Jan. 30, 2007

(54) WAVELENGTH CONVERSION APPARATUS

(75) Inventors: Tomotaka Katsura, Tokyo (JP);
Susumu Konno, Tokyo (JP); Tetsuo Kojima, Tokyo (JP); Junichi Nishimae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/940,817

(22) Filed: Sep. 15, 2004

(65) Prior Publication Data
US 2005/0068998 A1    Mar. 31, 2005

(30) Foreign Application Priority Data
Sep. 26, 2003  (JP)  ............................. 2003-335670
Mar. 29, 2004  (JP)  ............................. 2004-094721

(51) Int. Cl.
*H01S 3/109* (2006.01)
(52) U.S. Cl. ............................................. 372/22
(58) Field of Classification Search .................. 372/22, 372/21
See application file for complete search history.

(56) References Cited

U.S. PATENT DOCUMENTS
5,850,407 A * 12/1998 Grossman et al. ............ 372/22

* cited by examiner

*Primary Examiner*—Minsun Oh Harvey
*Assistant Examiner*—Rory Finneren
(74) *Attorney, Agent, or Firm*—Leydig, Voit & Mayer, Ltd.

(57) ABSTRACT

A wavelength conversion apparatus in which output direction of a wavelength-converted laser beam, having a wavelength converted by a nonlinear optical crystal and emitted through an output-window, can be brought close to the direction of optical axis of the laser beam passing through the nonlinear optical crystal. In addition, axial deviation of the wavelength-converted laser beam converted by the nonlinear optical crystal and emitted through an output-window, can be reduced when the position of the nonlinear optical crystal is moved. The output facet of the nonlinear optical crystal is inclined at Brewster's angle with respect to the wavelength-converted laser beam. An output-window of a case containing the nonlinear optical crystal has a prism form in which the distance between a laser beam input facet and a laser beam output facet of the output-window is reduced along a direction in which the wavelength-converted laser beam, emitted from the nonlinear optical crystal, inclines.

8 Claims, 3 Drawing Sheets

WAVELENGTH CONVERSION APPARATUS

BACKGROUND OF THE INVENTION

1. Field of the Invention

The present invention relates to a wavelength conversion apparatus for generating harmonics using nonlinear optical crystals, and in particular, to shapes of the harmonic output facet of nonlinear optical crystals, and shapes of the harmonic output-window of cases for housing such crystals.

2. Description of the Related Art

A conventional wavelength conversion laser apparatus reduces reflection losses of harmonics at a nonlinear optical crystal facet by Brewster-cutting the harmonic output facet of the nonlinear optical crystal (for example, refer to Patent Document 1).

Patent Document 1: Specification of U.S. Pat. No. 5,850,407 (Section 4, FIG. 1-A and 1-B)

In a situation where a Brewster-cut nonlinear optical crystal is used as in a conventional wavelength conversion laser, problems have been that output directions of the harmonics are skewed with respect to the optical axis of light passing through the nonlinear optical crystal, and that positioning later-stage light guiding systems is difficult. Moreover, a problem with the nonlinear optical crystal has been that when the facet deteriorates due to the harmonics, or when output power of the harmonics is decreased due to deposition of impurities, etc., if the position of the nonlinear optical crystal is shifted, the optical axis of the harmonics deviates.

SUMMARY OF THE INVENTION

The present invention has been made in order to solve the above problems, and aims at providing a wavelength conversion laser apparatus in which output direction of the wavelength-converted laser beam (the harmonic) converted by the nonlinear optical crystal and emitted through the output-window of the nonlinear optical crystal case, can be brought close to the direction of optical axis of the laser beams passing through the nonlinear optical crystal, in addition, axial deviation of the wavelength-converted laser beam (the harmonic) converted by a nonlinear optical crystal and emitted through an output-window, can be reduced when the position of the nonlinear optical crystal is moved.

Means for Solving the Problems:

A wavelength conversion laser apparatus related to the present invention comprises: a nonlinear optical crystal; a case in which the nonlinear optical crystal is housed; and an output-window for emitting wavelength-converted laser beam of which wavelength is converted by the nonlinear optical crystal. Moreover, the output facet of the nonlinear optical crystal is inclined at Brewster's angle to the wavelength-converted laser beam, and the output-window of the case has a prism form in which the distance between a laser beam input facet and a laser beam output facet of the output-window is reduced along the direction in which the wavelength-converted laser beam emitted from the nonlinear optical crystal inclines. Moreover, the inclination direction of the wavelength-converted laser beam emitted from the nonlinear optical crystal described above is the direction in which the beams are inclined with respect to the optical axis of the laser beams passing through the nonlinear optical crystal, in particular, the direction of the component perpendicular to the optical axis of the laser beams passing through the nonlinear optical crystal.

According to the present invention, because the output facet of the nonlinear optical crystal is inclined at Brewster's angle with respect to the wavelength-converted laser beam, and the output-window of the case in which the nonlinear optical crystal is housed has a prism form in which the distance between a laser input facet and a laser output facet is shortened along the inclination direction of the wavelength-converted laser beam emitted from the nonlinear optical crystal, the wavelength-converted laser beam emitted from the nonlinear optical crystal facet at Brewster's angle is refracted to the direction of the optical axis of the laser beam passing through the nonlinear optical crystal owing to the prismatic forming of the output-window of the case. Therefore, the output direction of the wavelength-converted laser beam converted by the nonlinear optical crystal and emitted through the output-window can be brought close to the direction of the optical axis of the laser beams passing through the nonlinear optical crystal. In addition, deviation of the optical axis of the wavelength-converted laser beam if the position of the nonlinear optical crystal has been shifted can be decreased.

DESCRIPTION OF THE PREFERRED EMBODIMENTS

Embodiment 1

Figure 1:
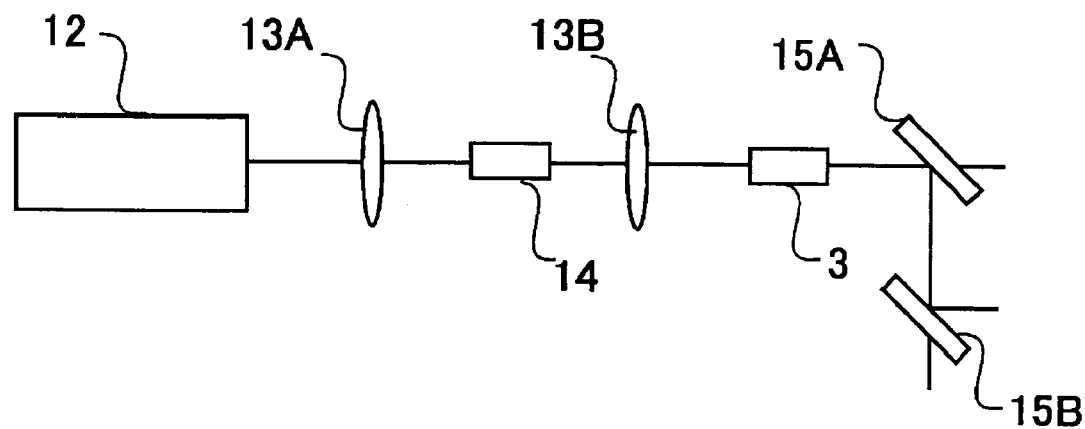
FIG. 1 is a schematic block diagram illustrating an overall configuration of a wavelength conversion apparatus according to Embodiment 1 of the invention.

FIG. 1 is a schematic block diagram illustrating an entire configuration of a wavelength conversion laser apparatus according to Embodiment 1 of the invention.

A fundamental generator 12 generates a fundamental. For example, a Q-switch Nd:YAG laser oscillator is used as the fundamental generator 12, the polarization is linear polarization, and the oscillation wave length is 1064 nm. The laser oscillator may be structured including an amplifier in order to gain output power. Moreover, the fundamental generator 12 may be a laser oscillator using laser crystals such as Nd:YVO$_4$, Nd:YLF or Nd:GdVO$_4$, in addition to the above described Nd:YAG. The generated fundamental is condensed to the nonlinear optical crystal 14 by the condenser lens 13A, the wavelength is converted by the nonlinear optical crystal 14, and a harmonic (a wavelength-converted laser beam) is generated. The nonlinear optical crystal 14 used in this situation is, for example, a TYPE I LBO ($LiB_3O_5$) crystal which is not covered with an anti-reflection coating, that is, doesn't have the anti-reflection coating. Because the nonlinear optical crystal 14 is not covered with the anti-reflection coating, the output power decreasing of the harmonics, which is caused by the deterioration or damage of the anti-reflection coating due to the harmonic generation, can be prevented. The harmonic generated at this moment is the second-harmonic, and the wave length is 532 nm.

Moreover, because deterioration of the second-harmonic generation crystal (the nonlinear optical crystal 14) is slower than that of a third-harmonic generation crystal (a nonlinear optical crystal 3) explained later, necessity of using the nonlinear optical crystal supporting apparatus (details of which are explained later) used for the third-harmonic generation crystal is low. However, the same nonlinear optical crystal supporting apparatus may be used in cases such as when the apparatus is used under conditions in which the beam-condensing power is high. The laser beams passed through the nonlinear optical crystal 14, that is, the second-harmonic generated in the nonlinear optical crystal 14 and the fundamental that is not converted are condensed onto the nonlinear optical crystal 3 using a condenser lens 13B, and the third-harmonic (wavelength 355 nm) whose frequency is the sum of the fundamental and second harmonic frequencies, is generated. The nonlinear optical crystal 3 used here is, for example, a TYPE II LBO ($LiB_3O_5$) crystal that is not covered with an anti-reflection coating. As with the situation of the nonlinear optical crystal 14, the output power decreasing of the harmonics caused by the deterioration or damage of the anti-reflection coating due to the harmonic emission can be prevented without coating the nonlinear optical crystal 3 with the anti-reflection.

The generated third-harmonic is separated from the second-harmonic and the fundamental by separating mirrors 15A and 15B, and is used in processing, etc.

Next, the nonlinear optical crystal 3 and the nonlinear optical crystal supporting apparatus 1 in which the nonlinear optical crystal 3 is housed are explained.

Figure 2:
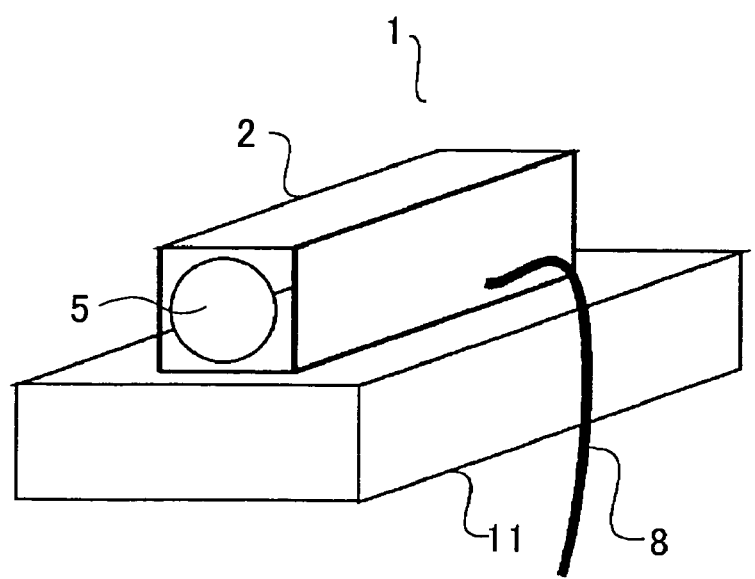
FIG. 2 is an oblique perspective view illustrating a schematic structure of a nonlinear optical crystal supporting unit used for the wavelength conversion apparatus according to Embodiment 1 of the invention.
Figure 3:
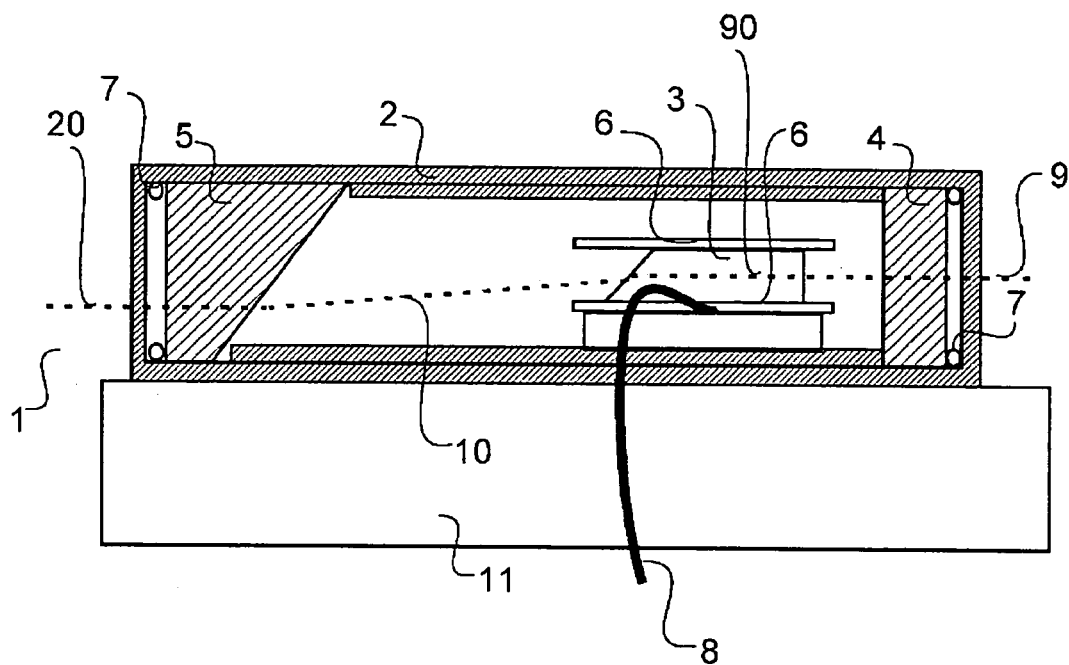
FIG. 3 is a sectional view illustrating a schematic structure of a nonlinear optical crystal supporting apparatus used for the wavelength conversion apparatus according to Embodiment 1 of the invention.

The nonlinear optical crystal 3 is held by the nonlinear optical crystal supporting apparatus 1 illustrated in FIG. 2 and FIG. 3.

FIG. 2 is an oblique perspective view in which the nonlinear optical crystal supporting apparatus 1 is viewed from an incline angle, and FIG. 3 is a sectional view in which the apparatus is cut in a plane parallel to the optical axis. The nonlinear optical crystal 3 is arranged in the nonlinear optical crystal canister 2. The nonlinear optical crystal canister 2 comprises the input-window 4 for entering the fundamental and the second-harmonic (the incident light beam) 9. Moreover, the canister comprises the output-window 5 for emitting the laser beams passed through the nonlinear optical crystal 3, that is, the harmonic (the wavelength-converted laser beam) 10 that has been generated in the non-linear optical crystal 3. Moreover, the thermoelectric element 6 (for example, Peltier device) for controlling temperature so as to adjust phase matching during wavelength conversion and the wire 8 for controlling the thermoelectric element 6 are housed in the nonlinear optical crystal canister 2. The nonlinear optical crystal canister 2 is accurately located on the crystal shifter 11, which is a shifting mechanism for shifting a position of the nonlinear optical crystal 3, and constitutes the nonlinear optical crystal supporting apparatus 1.

When the harmonic output portion on the output facet of the nonlinear optical crystal 3 is deteriorated by the harmonics or contaminated with impurity deposition, and output power of the harmonics is decreased, the output is recovered by shifting, using the crystal shifter 11, the nonlinear optical crystal 3 from the position where the output portion has deteriorated.

Moreover, in particular, because ultraviolet rays, of which wavelengths are not more than 400 nm, sensitively react to the deterioration, measures against the deterioration or deposition described above must be taken in order to extend maintenance cycle when the wavelength of the harmonic 10 is not more than 400 nm.

When the input-window 4 and the output-window 5 are installed in the nonlinear optical crystal canister 2, the inside of the nonlinear optical crystal canister 2 is sealed with the O-ring 7. On this occasion, deposition rate of impurities and deterioration rate on the facet of the nonlinear optical crystal 3 can be controlled by filling the canister with dry air, oxygen, or nitrogen, etc. Moreover, though the nonlinear optical crystal canister 2 is sealed completely in this Embodiment, it may be possible to continuously flow gas by making a small inlet and outlet.

Moreover, when the nonlinear optical crystal 3 is installed in the nonlinear optical crystal canister 2, the beam diameter of the harmonic 10 (for example, ultraviolet ray) can be increased if the nonlinear optical crystal 3 is located in such a way that the distance between the nonlinear optical crystal 3 and the output-window 5 is longer than the distance between the nonlinear optical crystal 3 and the input-window 4. Therefore, deposition rate of impurities to the output-window 5 and deterioration rate of the output-window 5 by the harmonic 10 can be controlled.

The harmonic output facet of the nonlinear optical crystal 3 (left side facet in FIG. 3) is inclined at predetermined angle $\theta_3$ with respect to the laser beam 90 passing through the nonlinear optical crystal 3 (wherein, $0<\theta_3<90°$), so that the wavelength-converted laser beam (the third-harmonic), of which wavelength is converted by the nonlinear optical crystal 3, is emitted at Brewster's angle $\theta_1$ from the facet, that is, emitted at Brewster's angle with respect to the wavelength-converted laser beam. In other words, the harmonic output facet of the nonlinear optical crystal 3 is Brewster-cut with respect to third-harmonic.

In this way, reflection losses of harmonics at a nonlinear optical crystal facet can be reduced by Brewster-cutting. In addition, because a beam area on the output facet of the nonlinear optical crystal 3 increases, the probability, due to harmonics, of damage at the output facet of the nonlinear optical crystal 3 and the rate of impurities adhering can be decreased.

Moreover, the orientation of Brewster-cut at this time is determined in such a way that the third-harmonic emitted from the nonlinear optical crystal 3 (the harmonic 10 emitted from the nonlinear optical crystal 3) is p-polarized with respect to the output facet of the nonlinear optical crystal 3. In an example of FIG. 3, the direction of polarized light of the third-harmonic (the harmonic 10 emitted from the nonlinear optical crystal 3) is parallel to the drawing sheet.

Figure 4:
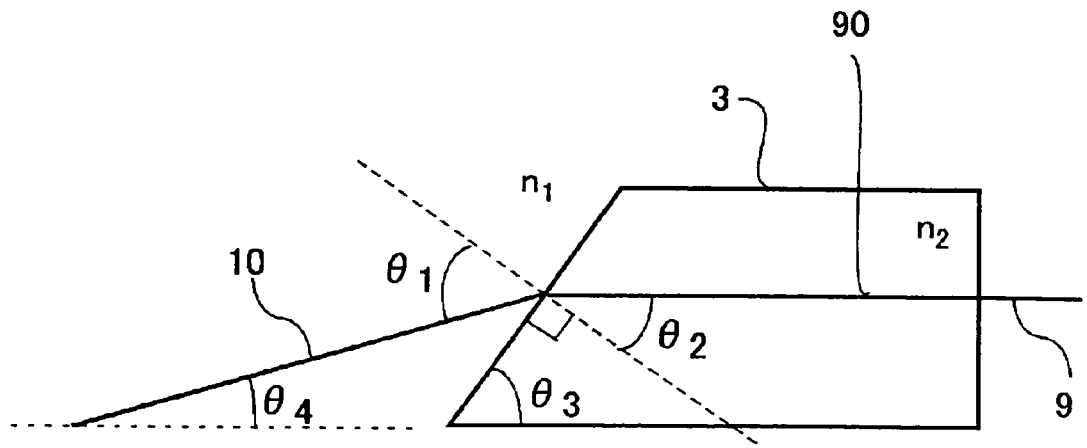
FIG. 4 is an elevation view for explaining a shape of harmonic output facet of a nonlinear optical crystal used for a wavelength conversion apparatus according to Embodiment 1 of the invention.

A Brewster-cut scene of the nonlinear optical crystal 3 is illustrated in FIG. 4. For example, if a TYPE II LBO crystal is used as the nonlinear optical crystal 3, the inclination angle $\theta_3$ of the nonlinear optical crystal 3 with respect to the optical axis of the laser beam 90 passing through the nonlinear optical crystal 3 is calculated as follows, with the Brewster-angle ($\theta_1$) definition described in Formula [1] and Snell's law described in Formula [2] when the third-harmonic (wavelength 355 nm) of the Nd:YAG laser is emitted by the nonlinear optical crystal 3.

$$\theta_1 = \tan^{-1}(n_2/n_1) \quad [1]$$

$$n_1 \sin(\theta_1) = n_2 \sin(\theta_2) \quad [2]$$
$$\theta_3 = 90° - \theta_2$$
$$= 90° - \sin^{-1}(n_2/n_1 \times \sin(\tan^{-1}(n_2/n_1)))$$
$$= 57.9°;$$

where, $n_2$ is a refraction index of the nonlinear optical crystal 3 with respect to the third-harmonic, $n_1$ is a refraction index of atmosphere in the nonlinear optical crystal canister 2 with respect to the third-harmonic, $n_1=1.0$, and $n_2=1.6$.

Moreover hereinafter, the inclination angle $\theta_3$, which is the output facet of the nonlinear optical crystal 3, with respect to the optical axis of the laser beam 90 passing through the nonlinear optical crystal 3 may sometimes be referred as a cut angle.

In this situation, an inclination angle $\theta_4$ of an optical axis of the third-harmonic 10 emitted from the nonlinear optical crystal 3, with respect to a horizontal plane, is calculated as given by the following formula.

$$\theta_4 = 90° - \sin^{-1}(1/n_1 \times \sin(\theta_1))$$
$$= 25.9°$$

Moreover, the angle $\theta_4$ is exactly an inclination angle with respect to the laser beam 90 passing through the nonlinear optical crystal 3, and the angle is the same as the inclination angle with respect to the horizontal plane of the optical axis, if the optical axis of the laser beam 90 passing through the nonlinear optical crystal 3 is arranged in the horizontal orientation.

Figure 5:
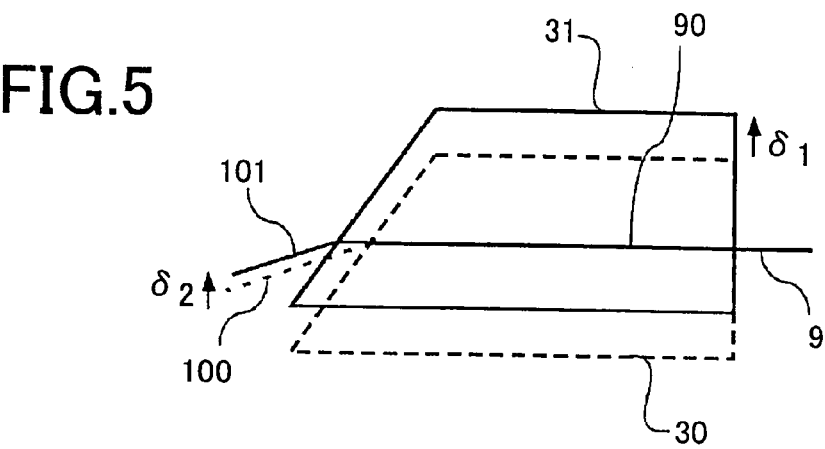
FIG. 5 is a view for explaining a state of optical axis shifting of generated harmonics in shifting the nonlinear optical crystal, according to Embodiment 1 of the invention.

Moreover, when the nonlinear optical crystal 3 is shifted by the crystal shifter 11 a distance of $\delta_1$ toward the direction orthogonal to the beam axis of the laser beam 90 passing through the nonlinear optical crystal 3, as described in FIG. 5, a shift distance $\delta_2$ between the optical axes of the third-harmonic 100 and 101 emitted from the nonlinear optical crystal 3 is calculated as given by the following formula.

$$\delta_2 = \delta_1 \times \tan(\theta_4)/\tan(\theta_3)$$
$$\cong 0.3 \times \delta_1$$

Moreover, the third-harmonic 100 is the wavelength-converted laser beam before shifting, and the third-harmonic 101 is the wavelength-converted laser beam after the crystal having been shifted.

In a conventional configuration, problems have been that the emitted harmonic (the third-harmonic emitted from the nonlinear optical crystal 3) is inclined with respect to the beam axis of the laser beam 90 passing through the nonlinear optical crystal 3, and the optical axis shifts when the crystal is moved by the crystal shifter 11.

Figure 6:
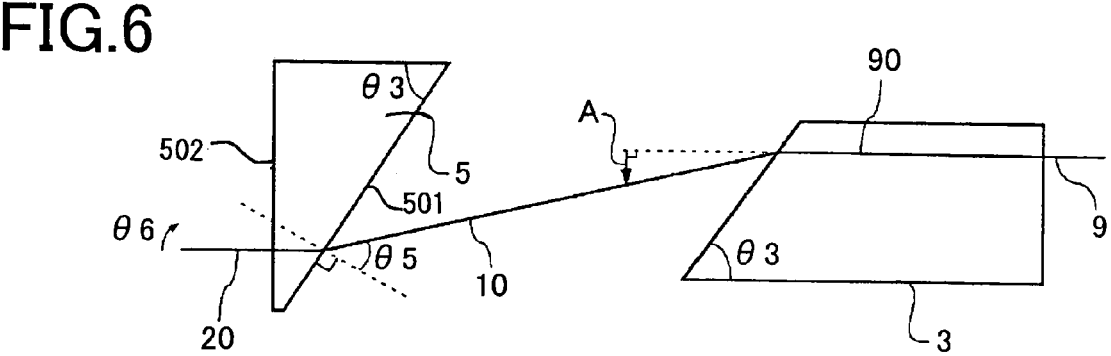
FIG. 6 is a view for explaining a shape of the output-window of a nonlinear optical crystal canister according to Embodiment 1 of the invention.

Next, the shape of the output-window 5 of the nonlinear optical crystal canister 2 is explained using FIG. 6. In the Embodiment, the output-window 5 made of material of which refraction index is the same as or similar to that of the nonlinear optical crystal 3 is used, and in addition, the crystal has, on that laser input facet, cutting with the angle $\theta_3$ that is the same as that on the harmonic output facet of the nonlinear optical crystal 3. For example, the refraction index of the nonlinear optical crystal 3 is 1.6, when the third-harmonic (wavelength 355 nm) is generated by the Nd:YAG laser with the TYPE II LBO crystal, which is similar to the refraction index of quartz. In other words, a refraction index of quartz with respect to abnormal polarized light is 1.57 at wavelength 355 nm.

Moreover, the laser output facet of the output-window 5 is nearly perpendicular to the optical axis of the laser beam 90, and the output-window 5 has a prism form wherein the distance between the laser beam input facet 501 and the laser beam output facet 502 of the output-window 5 is reduced along the inclination direction (the direction indicated with an arrow "A" in FIG. 6) of the emitted harmonic 10 (the wavelength-converted laser beam) emitted from the nonlinear optical crystal 3.

Moreover, the inclination direction of the wavelength-converted laser beam 10 emitted from the nonlinear optical crystal 3 described above is the direction in which the beam is inclined with respect to the optical axis of the laser beam 90 passing through the nonlinear optical crystal 3, in particular, the direction of the component perpendicular to the optical axis of the laser beam 90 passing through the nonlinear optical crystal 3, that is, the direction indicated with the arrow "A" in FIG. 6.

As described above, in this embodiment, a crystal is used as the output-window 5, and both the output facet of the nonlinear optical crystal 3 and the harmonic input facet of the output-window 5 have been cut in such a way that the facets have the same inclination angle (those angles are the same as the inclination angle $\theta_3$) with respect to the optical axis of the laser beam 90 passing through the nonlinear optical crystal 3. In this situation, the difference between the harmonic input angle $\theta_3$ with respect to the output-window 5 and Brewster's angle of the third-harmonic (wavelength 355 nm) with respect to the output-window 5 (the crystal quartz) is 0.4°, and the reflectance to the third-harmonic is less than 0.1%. However, in this particular situation, the output-window 5 has a reflectance to the beam having wavelength 532 nm (the second-harmonic) that has a different polarization direction. Therefore, an anti-reflection coating may be applied to the output-window 5, which is not reflective to the beam having wavelength 532 nm, or beams having wavelength 532 nm and wavelength 1064 nm (the fundamental). Moreover, instead of applying the above-described anti-reflective coating, the laser apparatus may be structured to allow flowing cooling water in the proximity of the portion on the nonlinear optical crystal canister, on which reflected beams are incident, so as to prevent the inside of the nonlinear optical crystal canister 2 from being overheated by the reflected beams. In this situation, the laser apparatus may be structured to effectively absorb the reflected beams, for example, by painting the portion of the output-window 5, on which reflected beams are incident.

In this situation, an inclination angle $\theta_6$ with respect to the horizontal plane (the axis of the laser beam 90 passing through the nonlinear optical crystal 3) of the harmonic 20 emitted from the nonlinear optical crystal canister 2 (the output-window 5) is 0.8°.

Then, the angle $\theta_6$ is reduced to not more than one thirty-second compared with the inclination angle $\theta_4$ ($\theta_4$=25.9°), which is the angle when the output-window 5 of the nonlinear optical crystal canister is not inclined.

Figure 7:
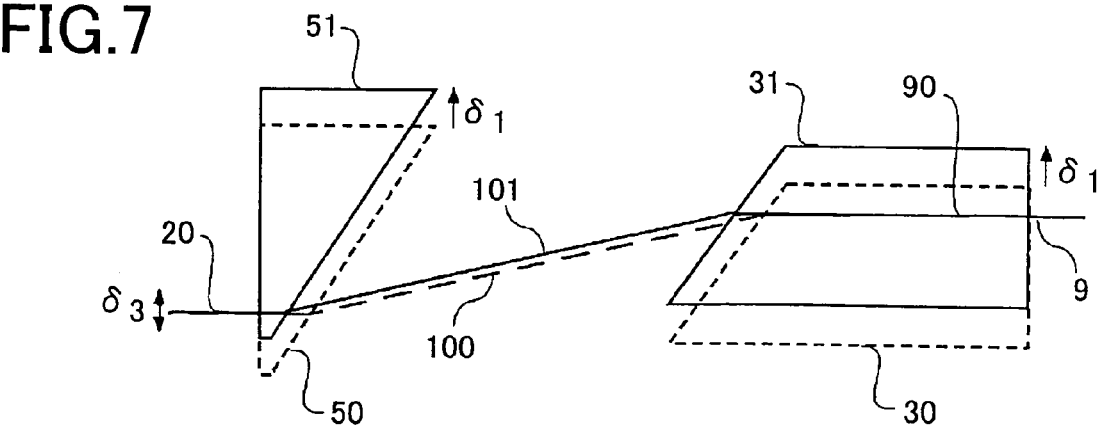
FIG. 7 is a view for explaining a state of optical axis shifting of harmonics emitted from a nonlinear optical crystal canister in shifting the nonlinear optical crystal according to Embodiment 1 of the invention.

Moreover, when the nonlinear optical crystal 3 is shifted a distance of $\delta_1$ by the crystal shifter 11 as described in FIG. 7, a shift distance $\delta_3$ of the optical axis (deviation of the optical axis) of the harmonic 20 emitted from the nonlinear optical crystal canister 2 is calculated by the following formula.

$$\delta_3=0.0056\times\delta_1$$

Then, the shift distance $\delta_3$ is extremely reduced, compared with the shift distance when the output-window of the nonlinear optical crystal canister is not inclined, that is, the distance $\delta_2$, given by $\delta_2=0.3\times\delta_1$, described above in FIG. 5.

As described above, according to the embodiment, the shift distance $\delta_3$ of the optical axis of the harmonic (the wavelength-converted laser beam) 20 emitted from the nonlinear optical crystal canister 2 (the output-window 5) can be reduced to practical range when the nonlinear optical crystal 3 is shifted by the crystal shifter 11.

Moreover, because the inclination angle $\theta_6$ with respect to the horizontal plane (the axis of the laser beam 90 passing through the nonlinear optical crystal 3) of the harmonic 20 emitted from the nonlinear optical crystal canister 2 (the output-window 5) can be reduced to a practical range, it becomes easy to locate laser beam guiding systems after its wavelength having been converted.

Though it would be ideal that the material of the output-window 5 of the nonlinear optical crystal canister 2 has, to the generated harmonic, the same refraction index at the wavelength of the generated harmonic as the nonlinear optical crystal 3, the material of the output-window may be structured with a material whose refraction index is close to the nonlinear optical crystal as with the Embodiment 1.

For example, if the refraction index of the material of the output-window 5 with respect to the above harmonic is within ±3% of the refraction index of the nonlinear optical crystal 3 when the third-harmonic (wavelength 355 nm) emitted from the Nd:YAG laser by the TYPE II LBO crystal, the inclination angle $\theta_6$ with respect to the horizontal plane (the axis of the laser beam 90 passing through the nonlinear optical crystal 3) of the harmonic 20 emitted from the nonlinear optical crystal canister 2 (the output-window 5) is not more than 1.7°; therefore, even if the nonlinear optical crystal 3 is shifted the distance $\delta_1$ by the crystal shifter 11 as described in FIG. 7, the shift distance $\delta_3$ of the optical axis of the harmonic 20 can be reduced within the distance given by the following formula.

$$\delta_3=0.012\times\delta_1$$

Moreover, the laser beam output facet of the output-window 5 can be slightly inclined from the perpendicular direction with respect to the optical axis of the laser beam 90 passing through the nonlinear optical crystal 3 to the opposite direction with respect to the output facet of the nonlinear optical crystal 3 in order to further reduce the inclination angle $\theta_6$ with respect to the horizontal plane of the emitted harmonic 20, and the shift distance $\delta_3$ of the optical axis.

Though it would be ideal that the inclination angle of the laser beam input facet of the output-window 5 is the same as the inclination angle of the output facet of the nonlinear optical crystal 3, the angle may not be limited to this. For example, if the refraction index with respect to the emitted harmonic 10 (the wavelength-converted laser beam) at the output-window 5 is not exactly the same as or slightly different from the refraction index with respect to the emitted harmonic 10 of the nonlinear optical crystal 3, the inclination angle of the laser beam input facet of the output-window 5 may be the same as the inclination angle at which the wavelength-converted laser beam by the nonlinear optical crystal 3 (the emitted harmonic 10) is entered to the laser beam input facet at Brewster's angle, that is, the inclination angle is Brewster's angle with respect to the wavelength-converted laser beam.

In this situation however, the inclination angle $\theta_6$ with respect to the horizontal plane (the axis of the laser beam 90 passing through the nonlinear optical crystal 3) of the emitted harmonic and the shift distance $\delta_3$ of the optical axis of the harmonic 20 emitted from the nonlinear optical crystal canister 2 do not become zero. However, the laser beam output facet of the output-window 5 can be slightly inclined from the perpendicular direction to the optical axis of the laser beam 90 passing through the nonlinear optical crystal 3 to the opposite direction with respect to the output facet of the nonlinear optical crystal 3, in order to further reduce the inclination angle $\theta_6$ and the shift distance $\delta_3$.

Moreover, the reflection on the laser beam input facet of the output-window 5 can be prevented by making the inclination angle of the laser beam input facet facing the output-window 5 identical to the inclination angle at which the wavelength-converted laser beam, of which wavelength is converted by the nonlinear optical crystal 3, is entered to the laser beam input facet at Brewster's angle.

Moreover, in the above explanation, though the nonlinear optical crystal 3 is an $LiB_3O_5$ (LBO) crystal, the crystal is not limited to this explanation, for example, the crystal may be a $CsLiB_3O_5$ (CLBO) crystal or BBO ($\beta$-$BaB_2O_4$) crystal. The same crystals may be used for the nonlinear optical crystal 14.

Embodiment 2

In the above explanation of Embodiment 1, though the laser output facet facing the output-window 5 is nearly perpendicular to the optical axis of the laser beam 90, a refraction index of the nonlinear optical crystal 3 with respect to the wavelength-converted laser beam of which wavelength is converted by the nonlinear optical crystal 3 is nearly the same as the refraction index of the output-window 5, and the inclination angle of the output facet of the nonlinear optical crystal 3 is nearly the same as the inclination angle of the laser beam input facet of the output-window 5, the invention may not be limited to this explanation.

For example, the laser input facet facing the output-window 5 is nearly perpendicular to the optical axis of the laser beam 90, the refraction index of the nonlinear optical crystal 3 with respect to the wavelength-converted laser beam of which wavelength is converted by the nonlinear optical crystal 3 is nearly the same as the refraction index facing the output-window 5, and the laser beam output facet of the output-window 5 can be inclined, to the opposite direction with respect to the output facet of the nonlinear optical crystal 3, by an angle that is similar to the inclination angle of the input facet of the nonlinear optical crystal 3. In this situation, the same effect as that in the above Embodiment 1 can also be obtained.

Embodiment 3

Moreover, regardless of the refraction index of the nonlinear optical crystal 3 with respect to the wavelength-converted laser beam of which wavelength is converted by the nonlinear optical crystal 3 and the refraction index of the output-window 5, furthermore, regardless of the inclination angle of the input facet of the nonlinear optical crystal 3, the output-window 5 of the nonlinear optical crystal canister 2 may have a prism form wherein the distance between the laser beam input facet and the laser beam output facet of the output-window is reduced along the direction in which the wavelength-converted laser beam emitted from the nonlinear optical crystal 3 inclines.

When the laser apparatus is structured as described above, the wavelength-converted laser beam (the harmonic) emitted from the output facet of the nonlinear optical crystal 3 at Brewster's angle is refracted to the direction of the optical axis of the laser beam 90 passing through the nonlinear optical crystal 3 owing to prismatic forming of the output-window 5. Therefore, the output direction of the wavelength-converted laser beam 20 converted by the nonlinear optical crystal 3 and emitted through the output-window 5 can be brought close to the direction of the optical axis of the laser beam 90 passing through the nonlinear optical crystal 3. In addition, deviation of the optical axis of the wavelength-converted laser beam 20 can be decreased when the nonlinear optical crystal is moved by the crystal shifter 11.

For example, if fused silica is used for the output-window 5 of the nonlinear optical crystal canister 2, the refraction index with respect to the third-harmonic of the Nd:YAG laser, having wavelength 355 nm, is 1.48. If the inclination angle of the output-window 5 is 56.5° in this situation, the beam-axis shift distance $\delta_3$ when the crystal is shifted, can be brought close to zero. In this situation, the inclination angle $\theta_6$ with respect to the horizontal plane (the axis of the laser beam 90 passing through the nonlinear optical crystal 3) of the harmonic 20 emitted from the nonlinear optical crystal canister 2 (the output-window 5) is 3.2°. Likewise, if the inclination angle of the output-window 5 is 52.8°, the inclination angle $\theta_6$ of the harmonic 20 can be brought close to zero, and the shift distance $\theta_3$ of the optical axis in this situation is given by the following formula.

$$\delta_3 = 0.10 \times \delta_1$$

Moreover, if calcium fluoride ($CaF_2$) is used for the output-window 5, a refraction index with respect to the harmonic having wavelength 355 nm is 1.45. If the inclination angle of the output-window 5 is 56.1°, in this situation, the shift distance $\delta_3$ when the crystal is shifted can be brought close to zero. The inclination angle $\theta_6$ in the situation is 4.0°.

Likewise, if the inclination angle of the output-window 5 is 51.4°, the inclination angle $\theta_6$ of the harmonic 20 can be brought close to zero, the shift length of the optical axis at the situation is calculated by the following formula.

$$\delta_3 = 0.14 \times \delta_1$$

In the above figures, each of laser beams, that is, the second-harmonic (the incident light beam) 9, the emitted harmonic (the wavelength-converted laser beam) 10 from the nonlinear optical crystals, the emitted harmonic 20 from the output-window (the nonlinear optical crystal canister), the laser beam 90 passing through the nonlinear optical crystal, the emitted harmonic 100 from the nonlinear optical crystal (before shifting by the crystal shifter), and the emitted harmonic 101 from the nonlinear optical crystal (after shifting by the crystal shifter), indicates each optical beam axis.

What is claimed is:

1. A wavelength conversion apparatus comprising:
   a case;
   an input window mounted in the case at an input end of the case and substantially transparent to at least one input laser beam;
   a nonlinear optical crystal located within the case, having an incident facet opposite and spaced from the input window, on which the at least one input laser beam is incident along an optical axis, the nonlinear optical crystal converting the at least one input laser beam to light at an output wavelength that different from wavelengths of the at least one input laser beam, the nonlinear optical crystal having an output facet at which the light at the output wavelength is output, the output surface being inclined, relative to the optical axis, at the Brewster angle of the crystal and ambient within the case; and
   an output window mounted in the case at an emission end of the case, opposite and spaced from the output facet of the nonlinear optical crystal, the output window having a prism shape which has a cross-section in a plane containing the optical axis that has a width, parallel to the optical axis, that continuously decreases along a direction perpendicular to the optical axis.

2. The wavelength conversion apparatus as recited in claim 1, wherein the output wavelength is not more than 400 nm.

3. The wavelength conversion apparatus as recited in claim 1, wherein the nonlinear optical crystal is mounted for movement perpendicular to the optical axis.

4. The wavelength conversion apparatus as recited in claim 1, wherein the nonlinear optical crystal is selected from the group consisting of $LiB_3O_5$, $CsLiB_6O_{10}$, and $\beta\text{-}BaB_2O_4$.

5. The wavelength conversion apparatus as recited in claim 1, wherein the output facet of the nonlinear optical crystal is free of an anti-reflection coating.

6. The wavelength conversion apparatus as recited in claim 1, wherein the nonlinear optical crystal and the output window have substantially the same refractive index at the output wavelength.

7. The wavelength conversion apparatus as recited in claim 6, wherein the output window has an input surface facing the output facet of the nonlinear optical crystal and that is inclined relative to the optical axis, and an emission surface that is substantially perpendicular to the optical axis.

8. The wavelength conversion apparatus as recited in claim 7, wherein the output facet of the nonlinear optical crystal is substantially parallel to the input surface of the output window.

\* \* \* \* \*